US009684936B2

(12) United States Patent
Stonelake et al.

(10) Patent No.: US 9,684,936 B2
(45) Date of Patent: Jun. 20, 2017

(54) METHODS, SYSTEMS, AND USER INTERFACES FOR PRESENTING LOCAL FAVORITES

(71) Applicant: FACEBOOK, INC., Menlo Park, CA (US)

(72) Inventors: Kelly Stonelake, Seattle, WA (US); Thomas Brown, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 297 days.

(21) Appl. No.: 13/843,698

(22) Filed: Mar. 15, 2013

(65) Prior Publication Data

US 2014/0279861 A1    Sep. 18, 2014

(51) Int. Cl.
*G06F 7/00* (2006.01)
*G06F 17/00* (2006.01)
*G06Q 50/00* (2012.01)
*G06Q 10/10* (2012.01)

(52) U.S. Cl.
CPC ............. *G06Q 50/01* (2013.01); *G06Q 10/10* (2013.01)

(58) Field of Classification Search
USPC ........................................................ 707/609
See application file for complete search history.

(56) References Cited

U.S. PATENT DOCUMENTS

| 8,489,445 | B1* | 7/2013 | Berg et al. ................... 705/7.34 |
| 2008/0140719 | A1* | 6/2008 | Chaney et al. ............ 707/104.1 |
| 2011/0078243 | A1* | 3/2011 | Carpenter et al. ............ 709/204 |
| 2011/0113100 | A1* | 5/2011 | Chawla ............... G06F 17/3087 709/205 |

\* cited by examiner

*Primary Examiner* — Muluemebet Gurmu
(74) *Attorney, Agent, or Firm* — Nicholson De Vos Webster & Elliott LLP

(57) ABSTRACT

Systems, methods, and apparatuses for providing local favorites are described. In some embodiments, the method entails receiving an indication from a first user of the social network of a local favorite to add or change on the local favorites page for a particular geographic location, updating the first user's local favorites page based on the received indication and storing the updated page in a database of the social network, and creating and publishing a posting regarding the first user's updated local favorites page on the social network on behalf of the first user of the social network.

20 Claims, 13 Drawing Sheets

Search Engine ← 501

Web  Images  Videos  Shopping  News  Maps  More

San Francisco, California

San Francisco, California Travel Guide
Explore top attractions and photos. Find great deals on flights and hotels.
Map - Hotels - Flights - Attractions - Events - Restaurants 54 F          Attractions
Mostly Cloudy  Golden Gate Bridge
              Alcatraz
$79           Fisherman's Wharf
LAX > SFO     Lombard Street Ryan's Local Favorites in San Francisco  ← 503

METHODS, SYSTEMS, AND USER INTERFACES FOR PRESENTING LOCAL FAVORITES

FIELD

Embodiments of the invention relate to social networking; and more specifically, to methods, systems, and user interfaces for presenting local favorites.

BACKGROUND

Internet search engines have greatly increased a user's ability to find specific places based on the user's specific search query. This does not provide a user with a more general recommendation for places or activities. Local directory services allow users to generate reviews and ratings of businesses on a local or national level. Results from searching these services provide a listing of businesses that meet the search criteria in an ordered ranking.

BRIEF DESCRIPTION OF THE DRAWINGS

The invention may best be understood by referring to the following description and accompanying drawings that are used to illustrate embodiments of the invention. In the drawings:

FIG. 5 illustrates an embodiment a search engine external to the social network and its interaction with the social network's local favorites;

DESCRIPTION OF EMBODIMENTS

Figure 1:
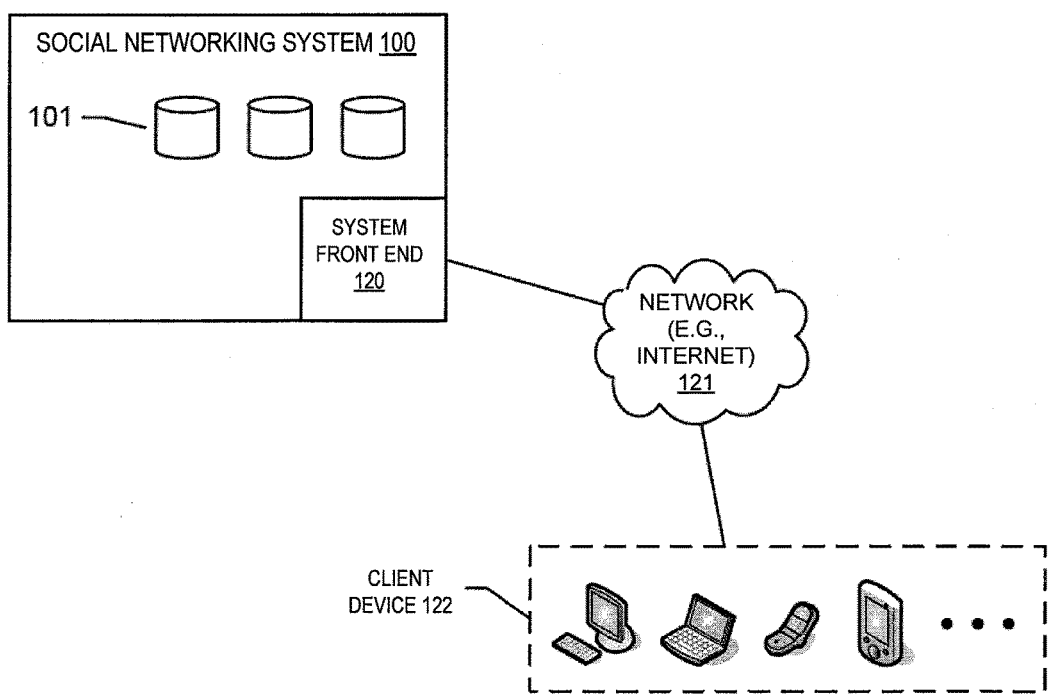
FIG. 1 is an example network environment of a social networking system according to an embodiment of the invention.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Detailed below are embodiments of methods, systems, and user interfaces for presenting local favorites in a social networking system. These user interfaces allow social network users to curate their favorite local restaurants, activities, etc. and make them available to their connections (and others) in the social network. As such, local favorites are given a more personal touch compared to the impersonal nature of generic search or local directory services.

A social networking system stores records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

FIG. 1 illustrates an example network environment of a social networking system. In particular embodiments, a social networking system 100 may comprise one or more data stores 101. For example, each data store 101 may comprise one or more mass storage devices and be in the form of a database. In particular embodiments, the social networking system 100 may store in data stores 101 a social graph comprising user nodes, concept nodes, and edges between nodes as described earlier. A user's or entity's local favorites page(s) information is associated with his/her user node. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social networking system 100 may comprise one or more computing devices (e.g., servers) hosting functionality directed to operation of the social networking system. In particular embodiments, one or more of data stores 101 may be operably connected to the social networking system's front end 120. A user of the social networking system 100 may access the social networking system 100 using a client device such as client device 122. In particular embodiments, front end 120 may interact with client device 122 through network 121. For example, front end 120 may be implemented in software programs hosted by one or more computing devices of the social networking system 100. Front end 120 may include web or Hypertext Transfer Protocol (HTTP) server functionality, as well as other functionality, to allow users to access the social networking system 100. Client device 122 may be a desktop computer, laptop computer, tablet computer, personal digital assistant (PDA), in- or out-of-car navigation system, smart phone or other cellular or mobile phone, or mobile gaming device, among other suitable computing devices.

Client device 122 may execute one or more client applications, such as a web browser (e.g., Microsoft Windows Internet Explorer, Mozilla Firefox, Apple Safari, Google Chrome, Opera, etc.) or special-purpose client application (e.g., Facebook for iPhone or iPad, Facebook for Android, etc.), to access and view content over a computer network 121.

Network 121 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 122 may access the social network system 100.

In particular embodiments, the social networking system 100 may store in data stores 101 data associated with applications and services provided by the social networking system 100. In particular embodiments, the social networking system 100 may store user event data in data stores 101. For example, a user may register a new event by accessing a client application to define an event name, a time and a location, and cause the newly created event to be stored (e.g., as a concept node) in data stores 101. For example, a user may register with an existing event by accessing a client application to confirming attending the event, and cause the confirmation to be stored in data stores 101. For example, the social networking system 100 may store the confirmation by creating an edge in a social graph between a user node corresponding to the user and a concept node corresponding to the event, and store the edge in data stores 101. As another example, the social networking system 100 may store location information describing locations such as (but not limited to) cities, parks, buildings, parks, companies, organizations, restaurants, markets, tourist attractions, stores, cafes, etc. These locations may be stored as concept nodes in the social graph or as entirely separate data structures. This location information may include pictures of the location, contact information for the location (including but not limited to addresses, phone numbers, email addresses, online profile account names, names of employees, etc.), and ratings of the location from users of the social networking system 100 or from other entities. The ratings may include numeric ratings (e.g., a number rating between 0-100, a 0-5 "star" rating, or the like), text-based ratings (e.g., written descriptions of some aspect of the location), or even multimedia ratings including audio and/or visual content (including, but not limited to, photographs of the location, an audio recording of the location or of a user describing the location, videos recorded at or near the location or of people describing the location, etc.). The social networking system 100 may also communication with third-party websites such as search engines.

Figure 2:
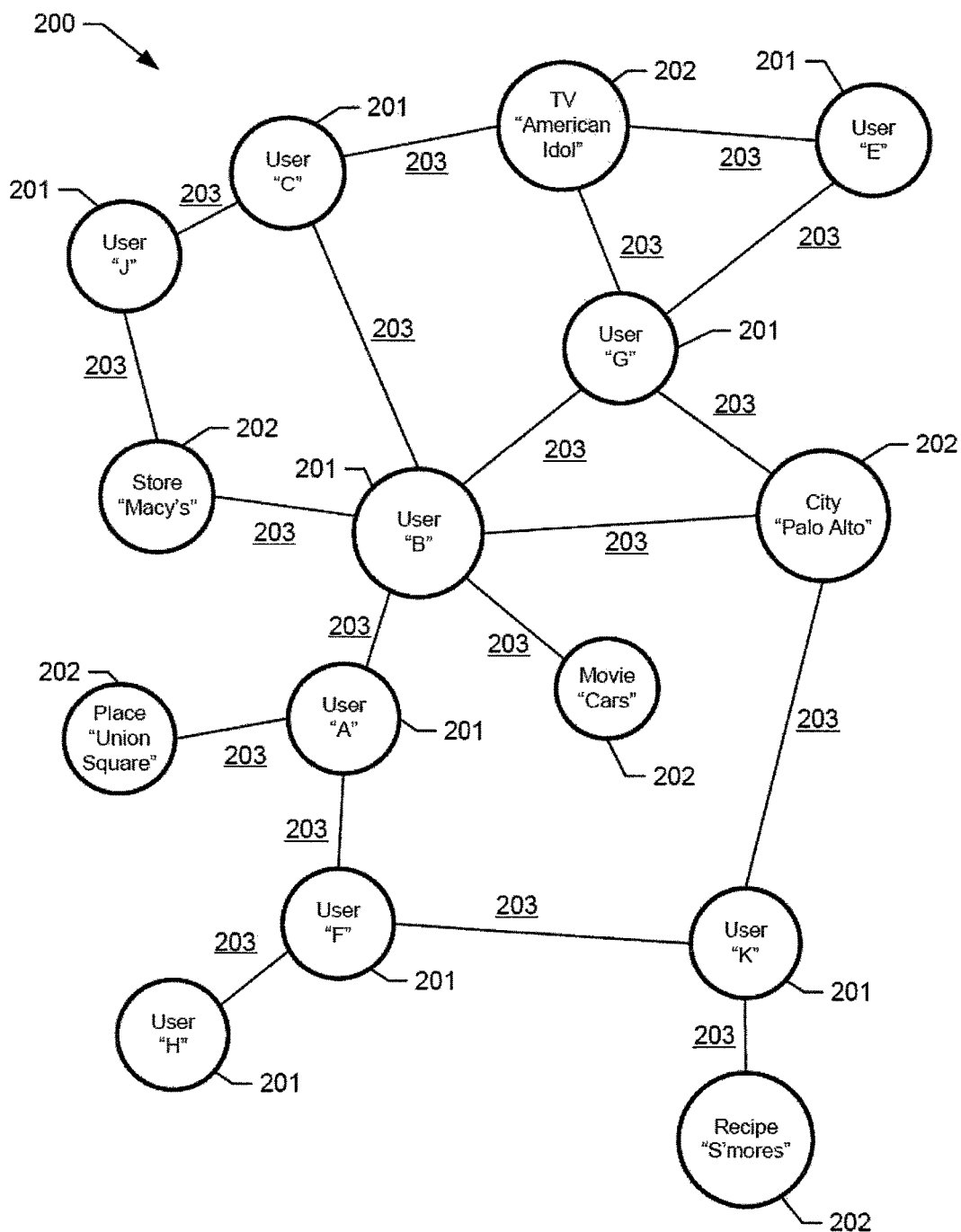
FIG. 2 is a diagram of an example social graph according to an embodiment of the invention.

FIG. 2 illustrates an example social graph 200 that may be used by a social networking system 100. In the example of FIG. 2, social graph 200 includes user nodes 201, concept nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and G" watch (or "like") a TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes the store "Macy's." Of course, social graphs can be much larger than social graph 200 illustrated in FIG. 2, and the number of edges and/or nodes in a social graph may be many orders of magnitude larger than that depicted herein.

As described earlier, an edge between a pair of nodes may indicate a direct relationship between the pair of nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. As described earlier herein, a degree of separation between any two nodes is defined as the minimum number of hops required to traverse the social graph from one node to the other. Thus, for user "B", the nodes for users "A", "C", and "G" are all one hop away and are thus users of first-degree and may be described as "connected to" or "friends" of user "B." However, from the standpoint of user "B", the nodes for users "E", "F", "J", and "K" are considered to have a second-degree of separation because the shortest path from user "B" to any of these nodes requires transiting through one other node. Thus, from the standpoint of user "B", users "E", "F", "J", and "K" are deemed "friends of friends." Accordingly, user "B" is either a "friend" or a "friend of a friend" with every other user in the graph except for user "H", as the shortest path between user "B" and user "H" transits through two user nodes.

Figure 3A:
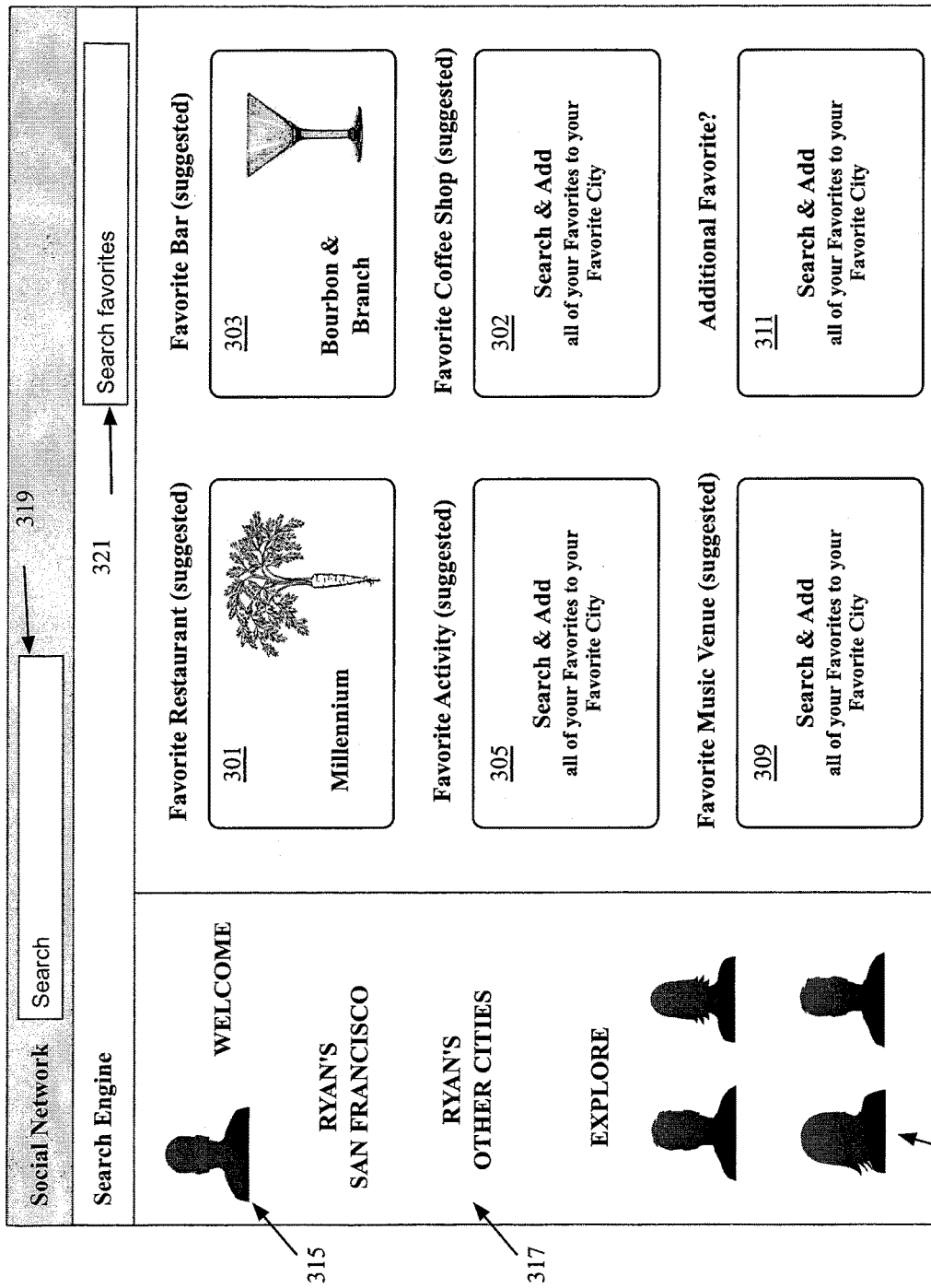
FIGS. 3(A)-(B) illustrate exemplary embodiments of a user interface for displaying a local favorites portal/page of a user of a social network.
Figure 3B:
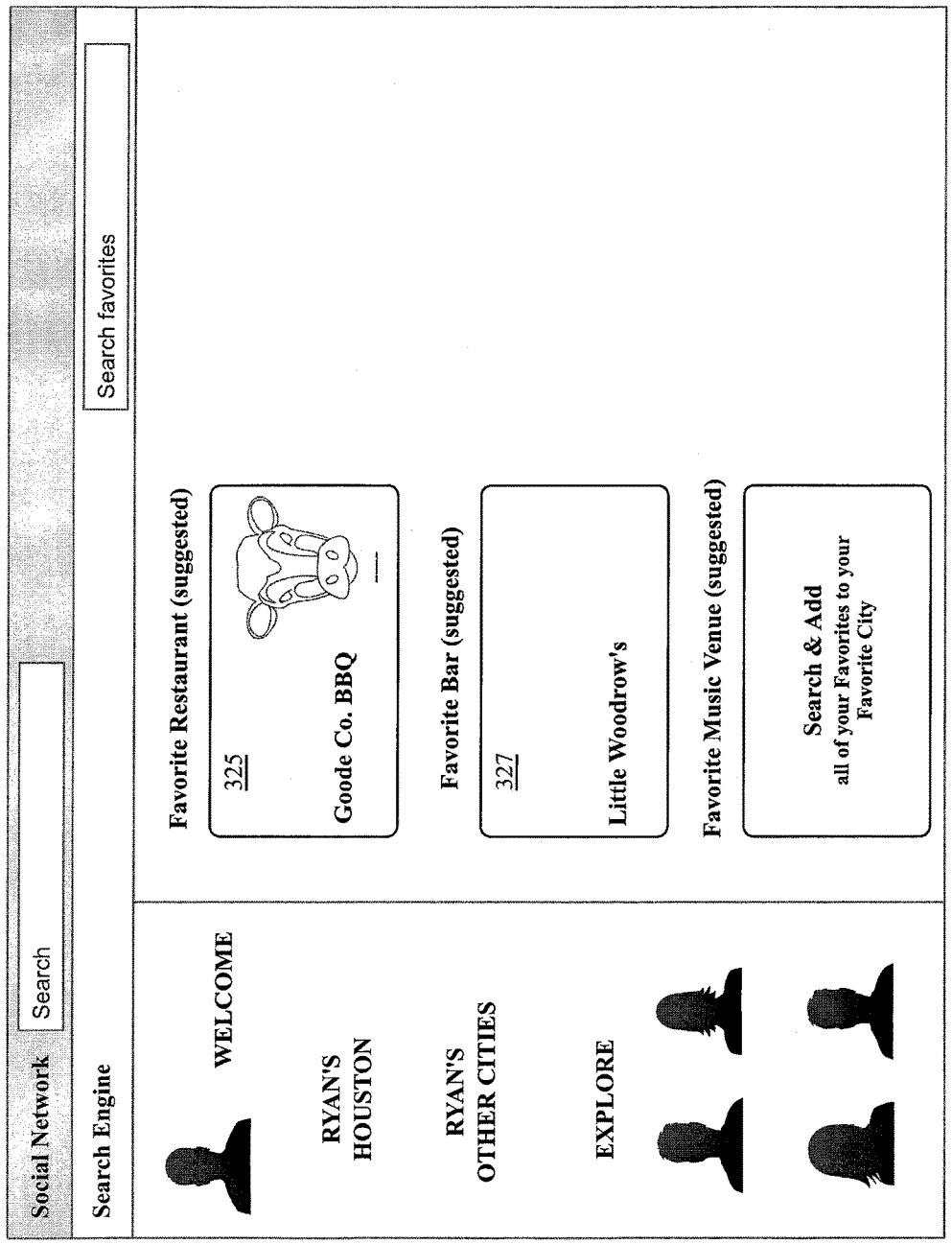

FIGS. 3(A)-(B) illustrate exemplary embodiments of a user interface for displaying a local favorites portal/page of a user of a social network. While this user interface may take on any number for forms, in some embodiments, the user interface shows the user's favorites for a particular location in a tile format as shown in FIG. 3(A). FIG. 3(B) illustrates a local favorites user interface for favorites 321-323 of the same user 315 of FIG. 3(A) in non-tile (list) manner.

This user interface is available to the user (shown as 315) and connections of that user (friends, friends of friends, fans, followers, etc.) on the social networking site (subject to privacy settings of the user). In the exemplary illustration, a subset of other users of the social network is populated 313 on the user interface such that the user is able to explore those user's favorites. These users may be connected to the user in some way (friend, friend of friend, etc.) and/or may be users that have also curated favorites for the locale that the user has shown an interest in.

In some embodiments, users may subscribe to others' favorites and get updates to those feeds. This subscription may not require that a social or entity graph connection. For example, a user may want to subscribe to a listing of favorite places/activities in a particular locale of celebrity and that may be accomplished without a graph connection. In some embodiments, this user interface (or the content thereof) is available as a search result from a search done through the social networking system or a third party search engine.

In the exemplary user interface, multiple categories (301-311) of the user's favorites in a particular locale are displayed. Exemplary categories include, but are not limited to: restaurant, bar, activity, coffee shop, music venue, museum, etc. These categories may be pre-populated on the user interface for the user to fill out, selectable by the user, or addable by the user. For example, in the illustration there are six pre-populated categories for the user to suggest a local favorite. The user selects a category and adds their favorite item for that category. In some embodiments, the social networking system provides a listing of businesses, etc. for the user to select from. The user may also add text about the business/activity to be displayed. The user interface may also allow for comments, likes, etc. to be shown. This user interface may also include the ability for a user to add another city and select between cities 317.

In some embodiments, the user interface also includes at least one search engine interface. The search engine may be specific to the social network 319 or an Internet search engine 321. These search engines allow a user to search for favorites in either forum.

Figure 4:
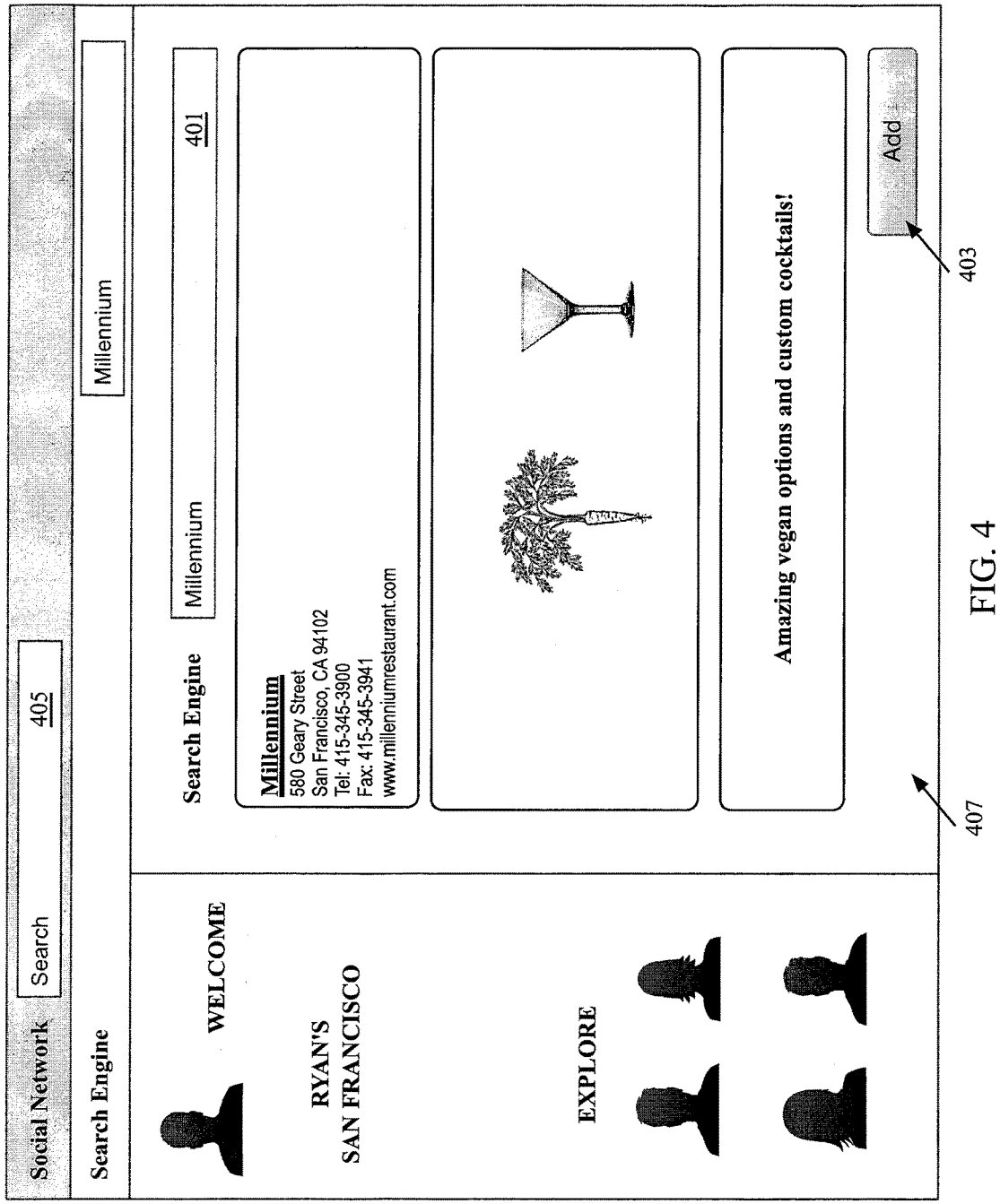
FIG. 4 illustrates a user's ability to add favorites from a search result.

In some embodiments, a user has the ability to add favorites from a search result. FIG. 4 illustrates an example of this functionality. In this particular illustration, a third party search engine 401 is viewed through a social network's portal. Once a search for the subject is made the external search engine via the social network portal, the user with the option to add a result of the search (here "Millennium") to his/her favorites through button 403. As such, the information that is populated in the search result display area 407 comes from the external search engine.

An internal search engine 405 could have also been used to search for the subject matter. This search will comb through the social network's information (such as social network entity or user profiles stored by the social network) to provide a result.

FIG. 5 illustrates an embodiment a search engine 501 external to the social network and its interaction with the social network's local favorites. As shown, the search engine's 501 results include not only typical results, but also a link to local favorites of at least one social network user 503. In some embodiments, social network users' allow their local favorites data to be shared with the third party search (for example, by using the user's saved social network profile information) subject to their privacy controls. This allows the search engine to provide results directly to the searching party for connections that they have that have local information that is applicable to the search. In other embodiments, a plug-in is used to add this functionality to a search result without the need for the third party search engine to have the user's profile information. In these embodiments, the user's browser will add this local favorites information by querying the social network directly without the external search engine's involvement.

Figure 6:
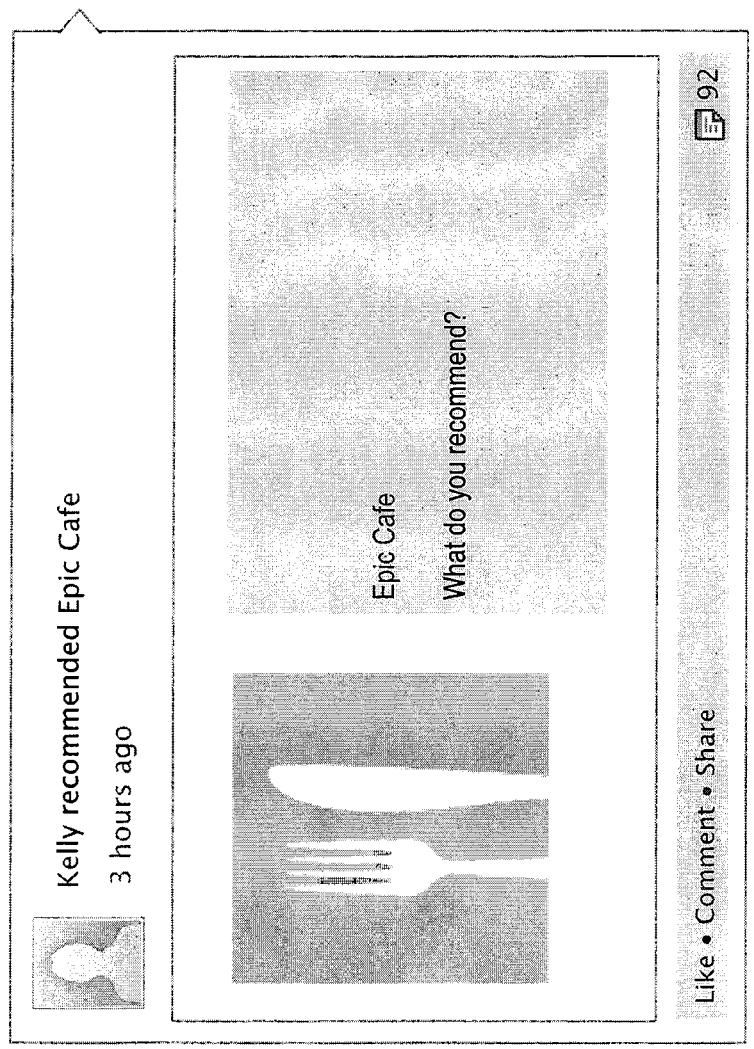
FIG. 6 illustrates an example of a posting created after a recommendation was made.

When a user adds a favorite to his/her favorites list a story or other posting is generated on behalf of the user and published on the social network. For example, when a user has recommended a particular restaurant a story is generated about that addition. The text of the story includes canned text (such as "USER X recommended PLACE Y" and/or user generated content (such as particular items in the restaurant that are good, a picture of the user at the location, etc.). FIG. 6 illustrates an example of a posting created after a recommendation was made. In this illustration, the story includes image content that may be automatically selected by the social network (for example, from a webpage associated with the recommendation including a profile of the location) or selected by the user. In some embodiments, stories are also generated upon a change in a favorite. For example, a user may have already chosen a particular restaurant and changed the text of what was good to eat at that restaurant). In some embodiments, this posting allows for a user to comment on, like, etc. the recommendation. Additionally, in some embodiments, a story or other posting is generated when a user comments on another's posting.

Figure 7:
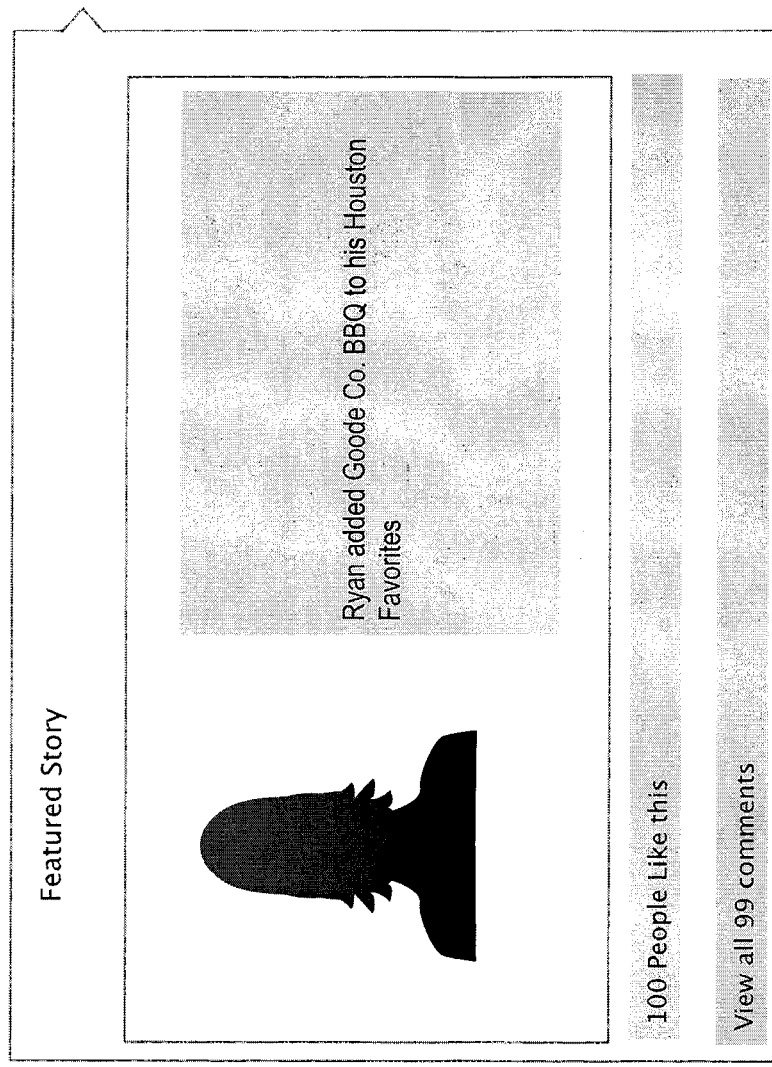
FIG. 7 illustrates an example of a featured posting.

Featured (promotional) postings may also be generated on behalf of the user. FIG. 7 illustrates an example of a featured posting. In this example, the user Ryan has added Goode Co. BBQ to his Houston favorites page. If Goode Co. BBQ, or one of its agents, has a deal with the social network to promote content, then a featured post such as this may be generated. Various factors of whether or not to create a featured post include, but are not limited to: the number of connections that the user has, previous interactions by other users with the user's posts, etc. Featured posts may also allow for comments, likes, etc.

Figure 8:
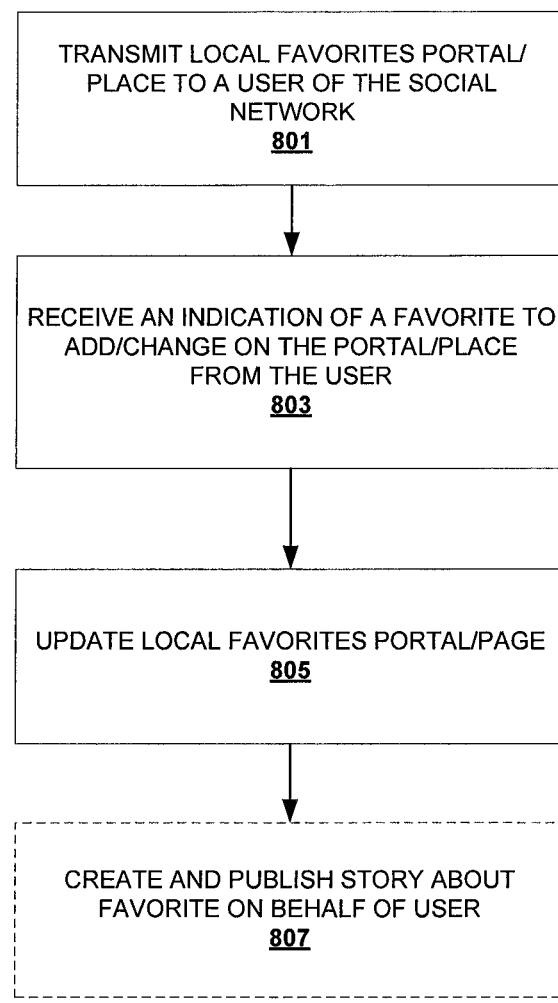
FIG. 8 illustrates an exemplary method of operation of local favorites at a social network.

FIG. 8 illustrates an exemplary method of operation of local favorites at a social network. At 801, a local favorites portal/page is transmitted to a user of the social network. For example, the content necessary to generate the user interface of FIG. 3 is transmitted from the social network to the user. This interface may be displayed on a browser of the user or on an application (such as a mobile or tablet application).

An indication is received, by the social network, of a favorite to add or change on the portal/page at 803. In this indication, the user will at least provide the social network with the name of the business or activity that he/she wished to curate as a favorite. If this addition is the result of a search, as detailed above, this name may be submitted by the search engine without the user having to submit the name directly. In some embodiments, the user may also submit additional content such as an image or text describing why this is a favorite.

The social network updates the portal/page at 805. This portal/page is stored by the social network on one or more of its servers and is associated with the user that created/modified it. Other users that subscribe to the portal/page will have connections to it.

In some embodiments, a story is created and published on behalf of the user that owns the portal/page at 807. Examples of the content a story have been detailed above. Depending upon the configuration, at any point in time after a favorite has been added, other users may comment, like, etc. the favorite.

In some embodiments, the social network will review portals/pages to determine if any of the content should be updated. For example, a favorite business may have closed and should likely be removed from any portal/page that lists it as a favorite. In most instances, the owner of the portal/page will be notified of that the favorite is outdated prior to any potential removal, however, that does not need to be the case.

Figure 9:
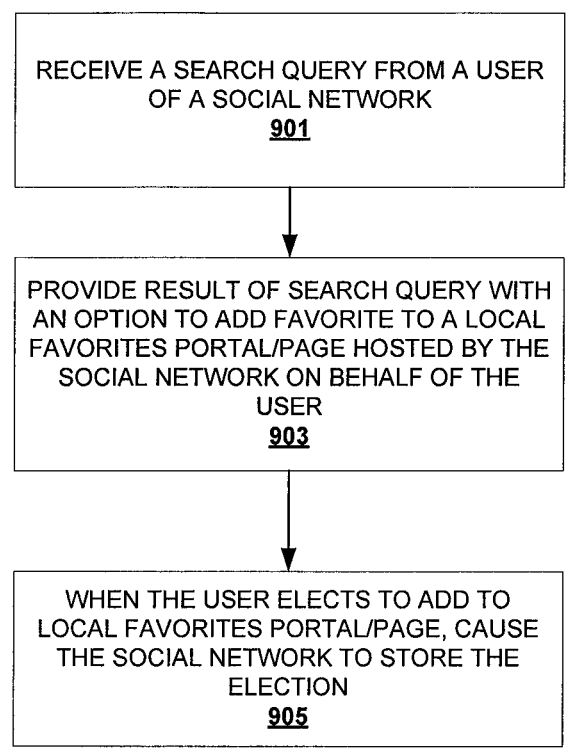
FIG. 9 illustrates an exemplary method of operation of local favorites at a social network using a search query.

FIG. 9 illustrates an exemplary method of operation of local favorites at a social network using a search query. At 901, a search query from a user of the social network is received. This query may be received by a third party search engine or by the social network. The search query may be of any type such as a search for a particular name of a location or a general search such as Thai restaurants in San Jose.

A result for the search query is provided to the user at 903. This result includes an option to add a favorite to the local favorites portal/page. This option is typically a button that is clickable (such as an "ADD" button). However, in some embodiments, the option is in the form of a link to the local favorites portal/page associated with the locale. If the user already has this has favorite, an option to edit the previous favorite may be provided.

When the user elects to add/update a favorite, the social network stores this addition/update at 903. This portal/page is stored by the social network on one or more of its servers and is associated with the user that created/modified it. Other users that subscribe to the portal/page will have connections to it.

Figure 10:
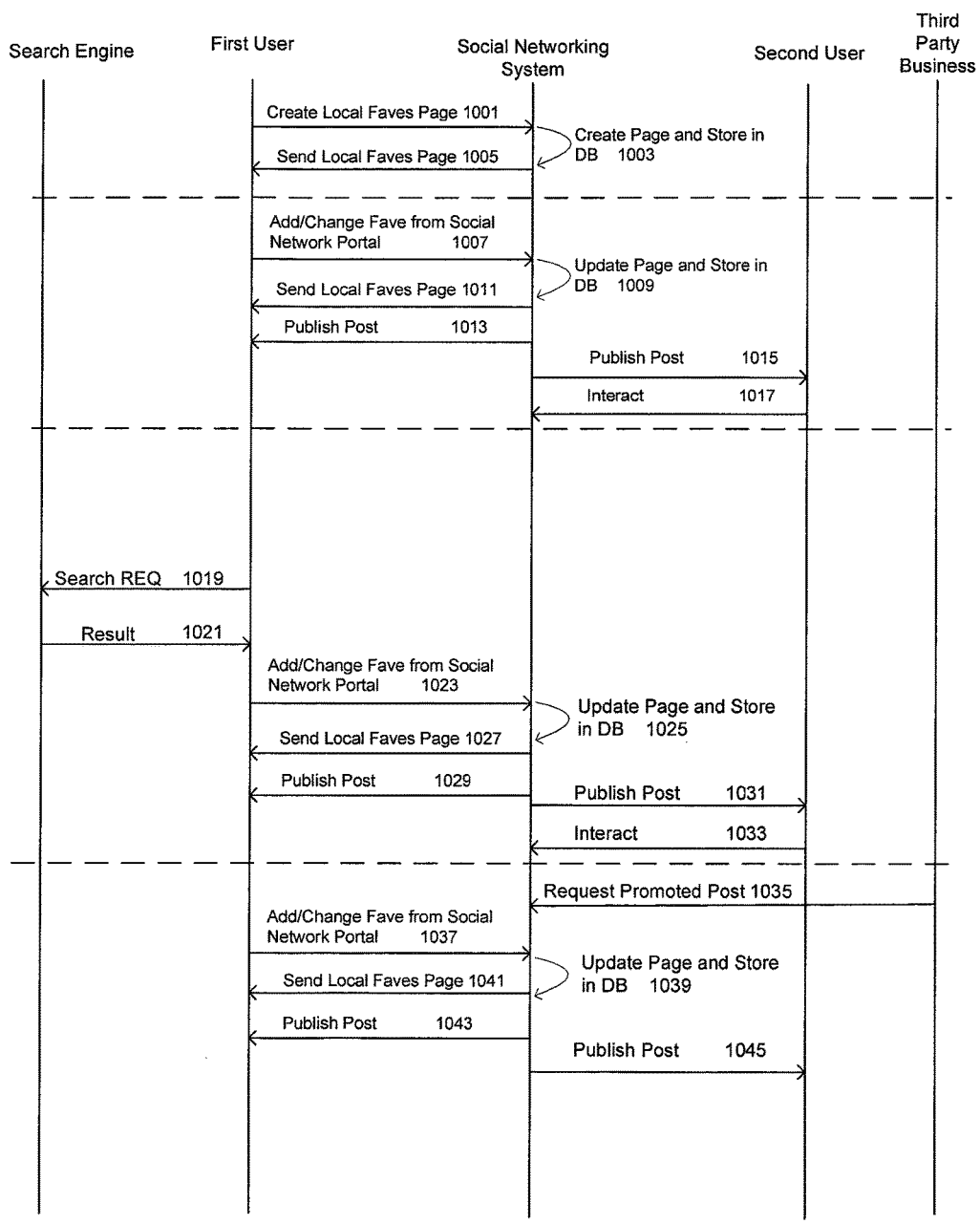
FIG. 10 illustrates an embodiment of exemplary actions between a social networking system, first and second users, and/or a search engine.

FIG. 10 illustrates an embodiment of exemplary actions between a social networking system, first and second users, and/or a search engine. In some embodiments, the initial local favorites page creation begins by the first user sending a creation request to the social networking system at 1001. However, in some embodiments, a local page is created by default. For example, a local page exists for the town that the user is located in. The social networking system creates the page and stores it in a database record associated with the first user at 1003. For example, the page is stored as a part of the user's profile. The local favorites page is then sent to the first user at 1005. This page is also available to other users of the social networking site and, in some embodiments, external sites, subject to the first user's privacy settings.

After the local favorites page has been created, it may be changed either organically (by actions within the social networking site) or inorganically (by actions outside of the social networking site). For organic changes, an add/change favorite request is sent from within the social networking site's portal for the first user to the social networking system at 1007. The social networking system updates the page (updates the user's profile, etc.) and stores any updates at 1009. The local favorites page is then sent to the first user at 1011. A post is published on the user's behalf (without requiring the user to do anything) by the social networking site about the update on the user's page/profile at 1013. As noted above, this post may include a business name, text, photos, etc. It will also allow connections of the user to comment, etc. on the post or non-connected users if the first user's privacy settings allow for this. Another post is published on the first user's behalf (without requiring the user to do anything) by the social networking site about the update on other (second, third, fourth, etc.) users' pages/profiles at 1015. Again, the post allows for commenting, etc. as indicated by the interaction of 1017.

For inorganic changes, the first user makes a search query to a search engine at 1019. Exemplary queries have been detailed above. The search engine returns a search result at 1021. As detailed above, the result may include a means for adding a favorite or viewing other users' favorites. This could be accomplished by the search engine or through a plug-in as detailed earlier.

If the first user wants to add/change a favorite based on the search result, an add/change favorite request is sent from within the social networking site's portal for the first user to the social networking system at 1023. The social networking system updates the page (updates the user's profile, etc.) and stores any updates at 1025. The local favorites page is then sent to the first user at 1027. A post is published on the user's behalf (without requiring the user to do anything) by the social networking site about the update on the user's page/profile at 1029. As noted above, this post may include a business name, text, photos, etc. It will also allow connections of the user to comment, etc. on the post or non-connected users if the first user's privacy settings allow for this. Another post is published on the first user's behalf (without requiring the user to do anything) by the social networking site about the update on other (second, third, fourth, etc.) users' pages/profiles at 1031. Again, the post allows for commenting, etc. as indicated by the interaction of 1033.

Finally, the figure illustrates a third-party business interacting with this feature. At 1035, the third-party sends a request to the social network to promote a post at 1035. After this, the same steps as detailed above are performed at 1037-45.

The above described local favorites portal/page embodiments may also be used as a part of a community building endeavor. A business or neighborhood association that wants to drum up more traffic to its store or area may create a neighborhood specific local favorites portal/page. Users that are familiar with the business (such as users that are connected to the business in a social graph) or area are able to populate the portal/page with other businesses and activities nearby. Of course, the business or neighborhood may also populate the portal/page. The business portal/page may also be integrated into a standalone application for the business. This integration allows the business to monitor the content of the recommendations and provide a useful service to its customers that use the application.

Figure 11:
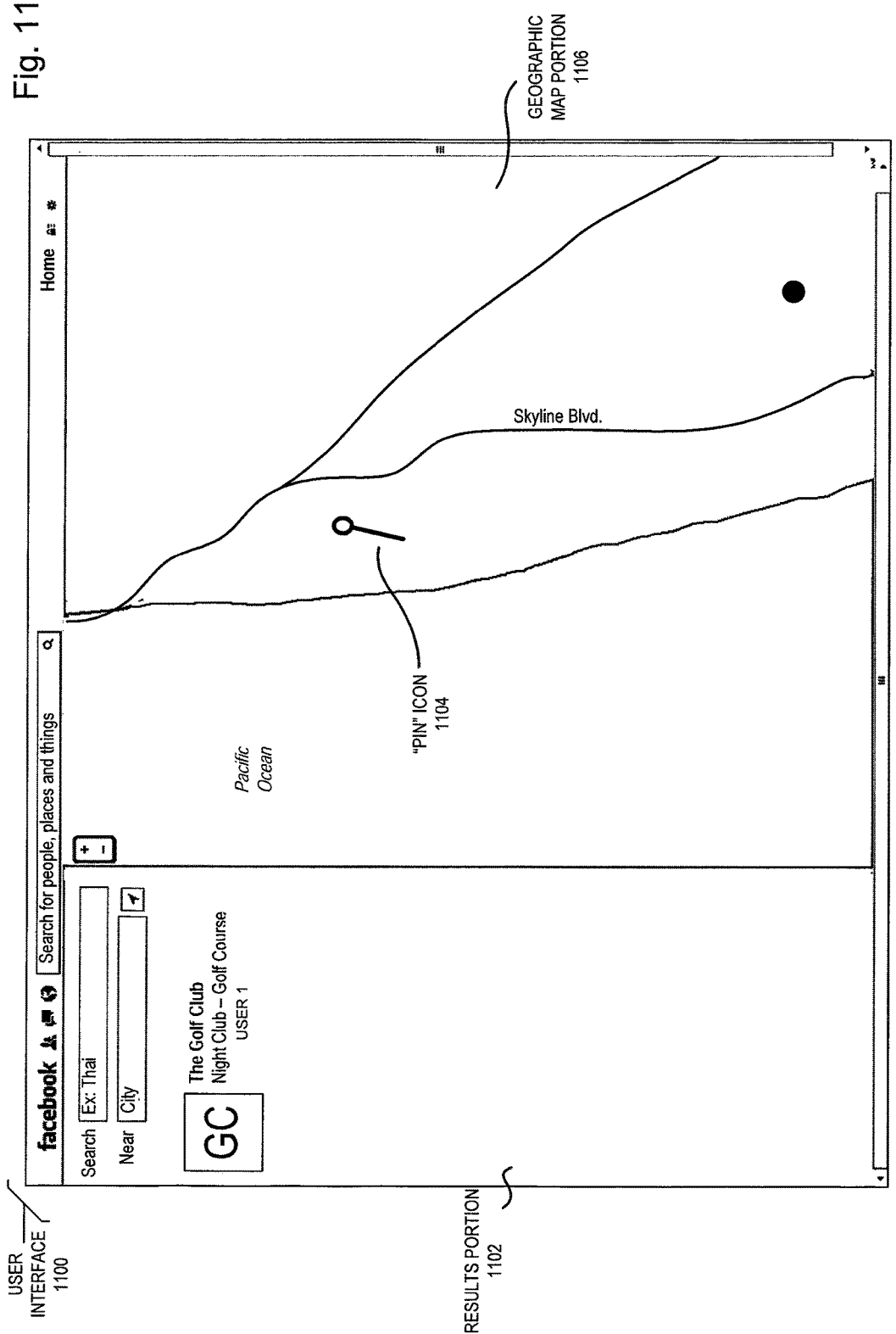
FIG. 11 illustrates an example of a map using local favorites.

In some embodiments, local favorites are integrated with a mapping application. This map shows the local favorites for others to see. This map may also show local favorites of friends, friends of friends, businesses, neighborhoods, etc. This map may be filterable such that only content for a particular friend or category is shown. Additionally, in some embodiments, a picture of the friend (or other connection) is used as a pin in the map for the location of the favorite place/activity. FIG. 11 illustrates an example of a map using local favorites. In this particular example, only favorites of USER 1 are shown on the map. A results portion 1102 displays results of a search for a particular search by location, user, type of place, etc. A geographic map portion 1106 displays pins 1104 at or near the location for each result. In some embodiments, location based services are used such that the use of the map application sees what has been curated as a local favorite near their location. In some embodiments, the local favorites are displayed according to a relative weight of friends v. public (for example, friends' favorites are higher ranked than the public).

Figure 12:
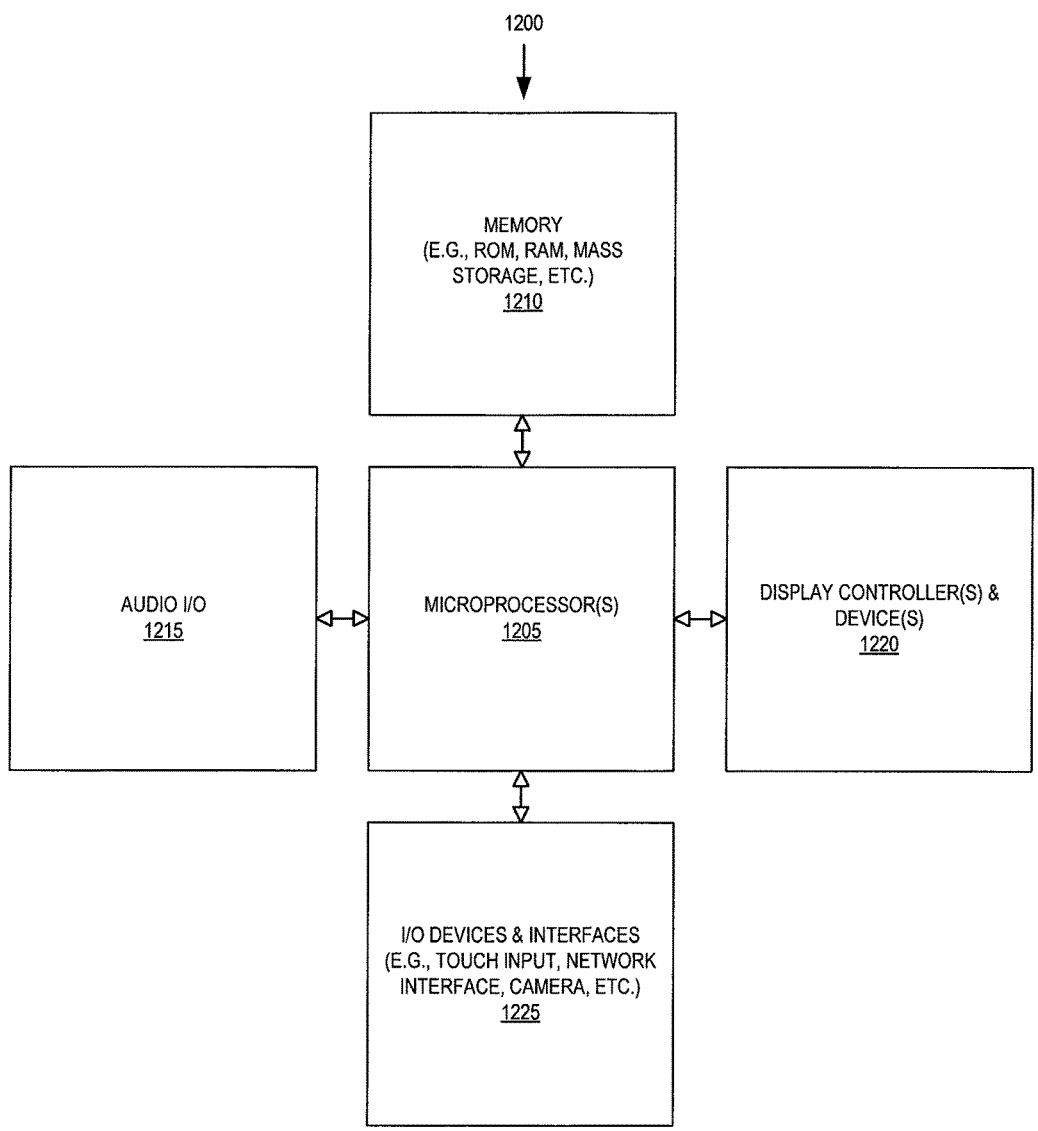
FIG. 12 illustrates a block diagram for an exemplary processing system to provide social network functionalities according to an embodiment of the invention.

FIG. 12 illustrates, in block diagram form, an exemplary data processing system 1200 to provide social networking functionalities. Data processing system 1200 includes one or more microprocessors 1205 and connected system components (e.g., multiple connected chips). Alternatively, the data processing system 1200 is a system on a chip.

The data processing system 1200 includes memory 1210, which is coupled to the microprocessor(s) 1205. The memory 1210 may be used for storing data, metadata, and programs for execution by the microprocessor(s) 1205. The memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1210 may be internal or distributed memory.

The data processing system 1200 also includes an audio input/output subsystem 1215 which may include a microphone and/or a speaker for, for example, playing back music or other audio, receiving voice instructions to be executed by the microprocessor(s) 1205, playing audio notifications, etc. A display controller and display device 1220 provides a visual user interface for the user, e.g., GUI windows.

The data processing system 1200 also includes one or more input or output ("I/O") devices and interfaces 1225, which are provided to allow a user to provide input to, receive output from, and otherwise transfer data to and from the system. These I/O devices 1225 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1200.

The I/O devices and interfaces 1225 may also include a connector for a dock or a connector for a USB interface, FireWire, Thunderbolt, Ethernet, etc. to connect the system 1200 with another device, external component, or a network. Exemplary I/O devices and interfaces 1225 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1200 with another device, external component, or a network and receive stored instructions, data, tokens, etc.

It will be appreciated that one or more buses may be used to interconnect the various components shown in FIG. 12.

The data processing system 1200 is an exemplary representation of a client device 110 or social networking system 100, but any of these features may also be utilized by one or more devices implementing the social networking system 100. The data processing system 1200 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 1200 may be a network computer, server, or an embedded processing device within another device or consumer electronic product. As used herein, the terms computer, system, device, processing device, and "apparatus comprising a processing device" may be used interchangeably with the data processing system 1200 and include the above-listed exemplary embodiments.

It will be appreciated that additional components, not shown, may also be part of the system 1200, and, in certain embodiments, fewer components than that shown in FIG. 9 may also be used in a data processing system 1200. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1210 or other non-transitory machine-readable storage medium. The software may further be transmitted or received over a network (not shown) via a network interface device 1225. In various embodiments, hardwired circuitry may be used in combination with the software instructions to implement the present embodiments. Thus, the techniques are not limited to any specific combination of hardware circuitry and software, or to any particular source for the instructions executed by the data processing system 1200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system including a network. Modules and components of hardware or software implementations can be divided or combined without significantly altering embodiments of the invention.

While these methods, systems, and user interfaces utilize both publicly available information as well as information provided by users of the social networking system, all use of such information is to be explicitly subject to all privacy settings of the involved users and the privacy policy of the social networking system as a whole.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method comprising:
    receiving an indication from a first user device of a first user of a communication system of a local favorite to add or change on a local favorites page comprising a collection of favorite entities for a particular geographic location, wherein the first user's local favorite is one of a business or an activity for the particular geographic location, wherein the indication of the local favorite includes an identifier of the local favorite and a user input regarding the local favorite;
    updating the first user's local favorites page to add or change the local favorite based on the received indication and storing the updated page in a database of the communication system;
    receiving a query from a second user regarding the particular geographic location;
    identifying users of the communication system associated with the second user having local favorites for the particular geographic region, the users including the first user;
    transmitting a graphical user interface to the second user, the graphical user interface including search results and user interface elements, each user interface element usable for accessing a local favorites page of the identified users;
    receiving a selection of a user interface element from the second user, the selected user interface element representing the first user's local favorites page; and
    in response to receiving the selection of the user interface element from the second user, transmitting the first user's local favorites page to the second user, including the first user's local favorite matching the particular geographic location.

2. The method of claim 1, further comprising:
    creating and publishing a posting regarding the first user's updated local favorites page on the communication system on behalf of the first user of the communication system.

3. The method of claim 1, wherein the query from the second user is made using a search engine of the communication system.

4. The method of claim 2, wherein the posting is published on user pages of other users of the communication system that are connected to the first user of the communication system.

5. The method of claim 1, wherein the first user's local favorites page availability is subject to privacy settings of the first user of the social communication system.

6. The method of claim 1, wherein the indication from the first user of the communication system of the local favorite to add or change on the local favorites page for the particular geographic location originated from a third-party search engine.

7. The method of claim 2, wherein the posting is a promoted post paid for by a third party.

8. The method of claim 2, wherein the identifier of the local favorite includes a name of a business and the user input includes text describing what the first user likes about the business, and the posting includes the name of the business and the first user's text.

9. A set of one or more computer-readable non-transitory storage media that provides instructions that, when executed by a computing device will cause said computing device perform a method comprising:
    receiving an indication from a first user device of a first user of a communication system of a local favorite to add or change on a local favorites page comprising a collection of favorite entities for a particular geographic location, wherein the first user's local favorite is one of a business or an activity for the particular geographic location, wherein the indication of the local favorite includes an identifier of the local favorite and a user input regarding the local favorite;

updating the first user's local favorites page to add or change the local favorite based on the received indication and storing the updated page in a database of the communication system;

receiving a query from a second user regarding the particular geographic location;

identifying users of the communication system associated with the second user having local favorites for the particular geographic region, the users including the first user;

transmitting a graphical user interface to the second user, the graphical user interface including search results and user interface elements, each user interface element usable for accessing a local favorites page of the identified users;

receiving a selection of a user interface element from the second user, the selected user interface element representing the first user's local favorites page; and in response to receiving the selection of the user interface element from the second user, transmitting the first user's local favorites page to the second user, including the first user's local favorite matching the particular geographic location.

10. The computer-readable non-transitory storage media of claim 9, the method further comprising:
creating and publishing a posting regarding the first user's updated local favorites page on the communication system on behalf of the first user of the communication system.

11. The computer-readable non-transitory storage media of claim 9, wherein the query from the second user is made using a search engine of the communication system.

12. The computer-readable non-transitory storage media of claim 10, wherein the posting is published on user pages of other users of the communication system that are connected to the first user of the communication system.

13. The computer-readable non-transitory storage media of claim 9, wherein the first user's local favorites page availability is subject to privacy settings of the first user of the communication system.

14. The computer-readable non-transitory storage media of claim 9, wherein the indication from the first user of the communication system of the local favorite to add or change on the local favorites page for the a particular geographic location originated from a third-party search engine.

15. The computer-readable non-transitory storage media of claim 10, wherein the identifier of the local favorite includes a name of a business and the user input includes text describing what the first user likes about the business, and the posting includes the name of the business and the first user's text.

16. An apparatus comprising:
a processor; and
memory to store program code, which when executed by the processor will cause the processor to:
receive an indication from a first user device of a first user of a communication system of a local favorite to add or change on a local favorites page comprising a collection of favorite entities for a particular geographic location, wherein the first user's local favorite is one of a business or an activity for the particular geographic location, wherein the indication of the local favorite includes an identifier of the local favorite and a user input regarding the local favorite;

update the first user's local favorites page to add or change the local favorite based on the received indication and store the updated page in a database of the communication system;

receive a query from a second user regarding the particular geographic location;

identify users of the communication system associated with the second user having local favorites for the particular geographic region, the users including the first user;

transmit a graphical user interface to the second user, the graphical user interface including search results and user interface elements, each user interface element usable for accessing a local favorites page of the identified users;

receive a selection of a user interface element from the second user, the selected user interface element representing the first user's local favorites page; and in response to receiving the selection of the user interface element from the second user, transmit the first user's local favorites page to the second user, including the first user's local favorite matching the particular geographic location.

17. The apparatus of claim 16, wherein execution of the program code further causes the processor to:
create and publish a posting regarding the first user's updated local favorites page on the communication system on behalf of the first user of the communication system.

18. The apparatus of claim 17, wherein the posting is published on user pages of other users of the communication system that are connected to the first user of the communication system.

19. The apparatus of claim 16, wherein the query from the second user is made using a search engine of the communication system.

20. The apparatus of claim 16, wherein the indication from the first user of the communication system of the local favorite to add or change on the local favorites page for a the particular geographic location originated from a third-party search engine.

* * * * *